(12) United States Patent
McFerrin

(10) Patent No.: US 11,705,837 B1
(45) Date of Patent: Jul. 18, 2023

(54) ELECTRICAL POWER CONVERSION DEVICE

(71) Applicant: Kenny M. McFerrin, Fresno, CA (US)

(72) Inventor: Kenny M. McFerrin, Fresno, CA (US)

( * ) Notice: Subject to any disclaimer, the term of this patent is extended or adjusted under 35 U.S.C. 154(b) by 107 days.

(21) Appl. No.: 17/476,564

(22) Filed: Sep. 16, 2021

(51) Int. Cl.
*H02P 9/02* (2006.01)

(52) U.S. Cl.
CPC ...................... *H02P 9/02* (2013.01)

(58) Field of Classification Search
CPC ... H02P 9/00; H02P 27/00; H02M 7/00; H02J 7/00; H02K 53/00
See application file for complete search history.

(56) References Cited

U.S. PATENT DOCUMENTS

| | | | |
|---|---|---|---|
| 7,511,451 B2 * | 3/2009 | Pierce | H01M 50/251 361/666 |
| 8,987,938 B2 | 3/2015 | Eschrich et al. | |
| 9,059,603 B2 | 6/2015 | Douglas et al. | |
| 10,097,028 B2 | 10/2018 | Virella | |
| 10,454,363 B1 | 10/2019 | Chung et al. | |
| 10,469,012 B2 | 11/2019 | Shropshire | |
| 10,742,062 B2 | 8/2020 | Virella | |
| 2015/0048703 A1 * | 2/2015 | Maldonado | G06Q 50/06 74/DIG. 9 |
| 2015/0244245 A1 | 8/2015 | Uys | |
| 2017/0141671 A1 | 5/2017 | Stubbings et al. | |
| 2017/0146602 A1 * | 5/2017 | Samp | G01R 31/34 |
| 2018/0167002 A1 | 6/2018 | Frampton et al. | |

* cited by examiner

*Primary Examiner* — Said Bouziane
(74) *Attorney, Agent, or Firm* — Cramer Patent & Design, PLLC; Aaron R. Cramer

(57) ABSTRACT

An electrical power conversion device produces more DC power (wattage) from a lesser amount of AC power. The device utilizes an AC motor that is powered by 120 VAC. The motor drives two (2) permanent magnet alternators (PMA) which produce AC power. This AC power is then rectified by two (2) rectifier modules into DC power. The rectifiers are mounted on a heat sink plate with cooling pegs. The device is mounted in a large metal enclosure complete with disconnect switches, power meters and cooling fans.

20 Claims, 5 Drawing Sheets

ELECTRICAL POWER CONVERSION DEVICE

RELATED APPLICATIONS

Non-applicable.

FIELD OF THE INVENTION

The present invention relates generally to an electrical power conversion device.

BACKGROUND OF THE INVENTION

From the beginning of time, mankind has relied on various sources of energy to survive. These sources have included wood, coal, oil, wind power, waterpower, and nuclear energy to just name a few. As each form of energy was discovered, mankind continued on in the quest for the next, better, form of energy. The ultimate goal has always been an energy source that does not require replenishment, does not require the consumption of natural resources, is continuous in operation, has no objectionable side effects and does not suffer from the emission of pollutants.

However, each form of energy that has been discovered is associated with related disadvantages including pollution, destruction of the ozone layer, nuclear contamination, accidental release of harmful radiation and the like. Accordingly, there is a need for a means by which electrical energy can be produced that is continuous in nature, does not require the consumption of natural resources or other replenishment and produces no pollution or other side effects. The development of the electrical power conversion device fulfills this need.

SUMMARY OF THE INVENTION

To achieve the above and other objectives, the present invention provides for an electrical power conversion device that has, an overall enclosure made of sheet metal over a tubular frame, a pair of floor mounting flanges utilized on a lowermost electrical power conversion device to secure the electrical power conversion device to a flooring surface, an incoming disconnect switch activating a plurality of incoming AC power, an output junction box activating a plurality of outgoing DC power, a facing having between two and ten digital displays to allow for monitoring a plurality of electrical parameters, an exhaust fan disposed on an exterior point on the overall enclosure to allow for cooling of a plurality internal components, an alternating current motor disposed on the bottom of the overall enclosure, a plurality of two to ten permanent magnet alternators disposed above the alternating current motor, a plurality of two to ten rectifiers converting the AC output of the permanent magnet alternators to direct current, a timer controlling operation for one hour of down time, a belt mechanically linked between the alternating current motor and the permanent magnet alternators and allows for rotation at a constant speed, and a belt tensioner keeping tension on the belt even as the belt ages and stretches.

The frame may extend from a top and a bottom of the overall enclosure to allow for stacking of a plurality of devices for increased electrical output. The overall enclosure may be made of sheet steel. The tubular frame may be made of steel. The incoming AC electrical power may be brought into the incoming disconnect switch where it is protected by one or more fuses. The AC output from the permanent magnet alternators may be directed to the rectifiers and subsequently to the output junction box. The alternating current motor may be selected from the group consisting of a Dayton, a Marathon, or a one and one-half horsepower motor running at one-thousand seven hundred and fifty rotations per minute or equal. The alternating current motor may be mounted to a mounting plate. The permanent magnet alternators may be mounted to a mounting plate to reduce vibration. The alternating current motor and the permanent magnet alternators may each be provided with a belt pulley with a cooling fan. The belt pulley with a cooling fan and the belt may be toothed to prevent slippage. The rectifiers may generate heat during operation, they are mounted on a heat sink plate. The heat sink plate may include a backplane upon which the rectifiers are mounted. A first side of the backplane may have a plurality of cooling pegs. The cooling pegs may have a plurality of additional surfaces area to dissipate heat generated by the rectifiers. Air movement generated from the exhaust fan may aid in heat removal from the cooling pegs. The timer may generate a fifty percent duty cycle for every one hour of run time. The timer may be routed to a hot terminal block and a neutral terminal block. Outputs from the hot terminal block and the neutral terminal block may include two to ten digital displays, the exhaust fan, and the alternating current motor. Mechanical coupling from the belt then may connect the alternating current (AC) motor to the permanent magnet alternators.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
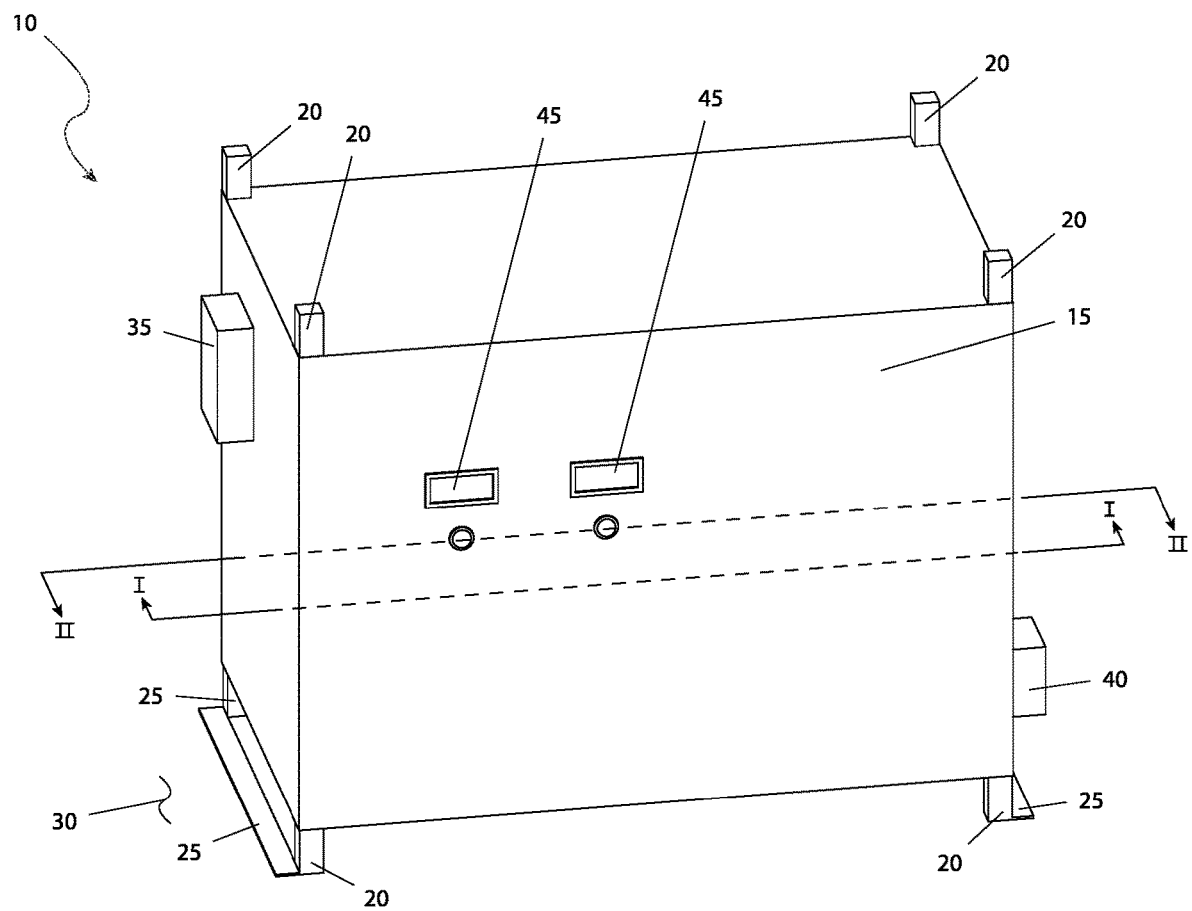
FIG. 1 is a perspective view of the electrical power conversion device 10, according to the preferred embodiment of the present invention.

10 electrical power conversion device
15 enclosure
20 frame
25 flange
30 flooring surface
35 incoming disconnect switch
40 output junction box
45 digital display
50 exhaust fan
55 alternating current (AC) motor
60 permanent magnet alternator (PMA)
65 rectifier 70 heat sink plate
75 timer
80 mounting plate
85 belt pulley with cooling fan
90 belt
95 belt tensioner
100 backplane
105 cooling peg
110 fuse
115 hot terminal block
120 neutral terminal block

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the electrical power conversion device 10, according to the preferred embodiment of the present invention is disclosed. The electrical power conversion device (herein also described as the "device") 10, provides for the conversion of AC electrical power to DC electrical power with an increase in efficiency. The device 10 is housed in an overall enclosure 15 made of sheet steel over a tube steel frame 20. The frame 20 extends from the top and bottom of the enclosure 15 to allow for stacking of multiple devices for increased electrical output. Two (2) floor mounting flanges 25 would be used on the lowermost device 10 to secure the device 10 to a flooring surface 30. An incoming disconnect switch 35 is provided for incoming AC power. An output junction box 40 is provided for outgoing DC power. Further description of incoming and outgoing power flows will be provided herein below. The face of the device 10 is provided with at least two (2) and no more than ten (10) digital displays 45 (total of two (2) digital displays 45 are shown for illustrative purposes) to allow for monitoring of electrical parameters of the operation of the device 10.

Figure 2:
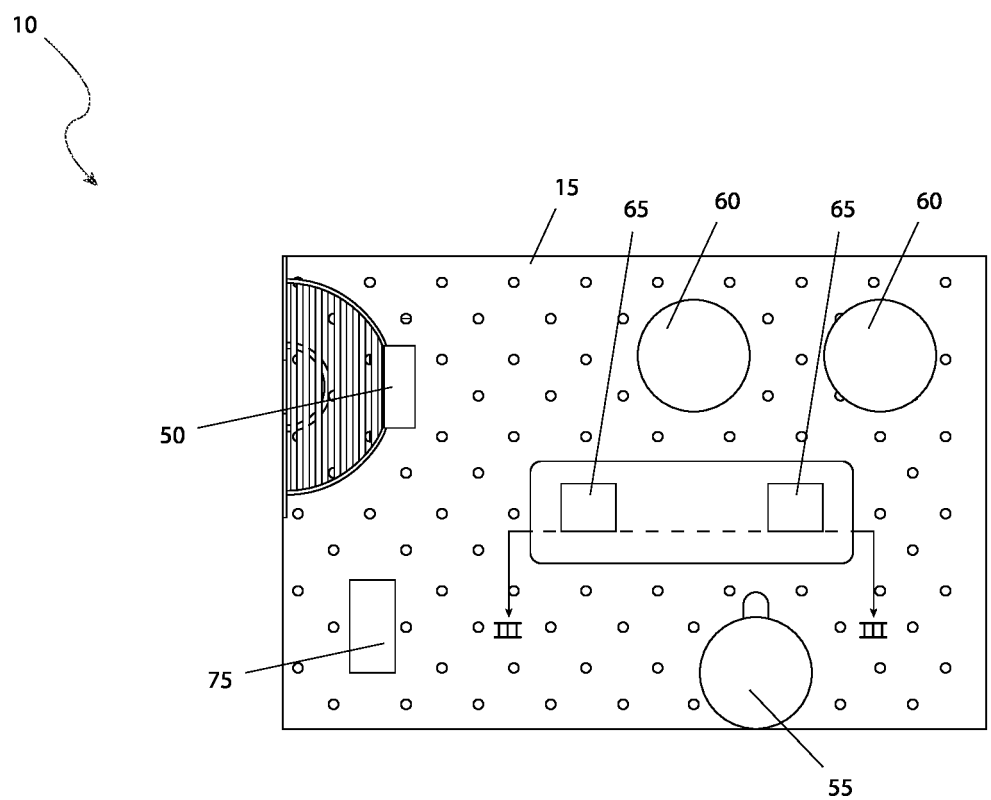
FIG. 2 is a sectional view of the electrical power conversion device 10, as seen along a Line I-I, as shown in FIG. 1, according to the preferred embodiment of the present invention.

Referring next to FIG. 2, a sectional view of the device 10, as seen along a Line I-I, as shown in FIG. 1, according to the preferred embodiment of the present invention is depicted. An exhaust fan 50 is provided at an exterior point on the enclosure 15 to allow for cooling of the internal components of the device 10. An alternating current alternating current (AC) motor 55 is located at the bottom of the enclosure 15.

The alternating current (AC) motor 55 is envisioned to be a "Dayton", "Marathon", or equal, one and one-half horsepower (1½ HP) motor running at one-thousand seven hundred and fifty rotations per minute (1,750 RPM) or equal. At least two (2) and no more than ten (10) permanent magnet alternators (PMA) 60 (total of two (2) permanent magnet alternators (PMA) 60 are shown for illustrative purposes) are provided above the alternating current (AC) motor 55. The mechanical interconnection between the alternating current (AC) motor 55 and the permanent magnet alternators (PMA) 60 will be shown in greater detail hereinbelow. At least two (2) and no more than ten (10) rectifiers 65 (total of two (2) rectifiers 65 are shown for illustrative purposes) are provided to convert the AC output of the permanent magnet alternators (PMA) 60 to direct current (DC). The rectifiers 65 are envisioned to each produce four-thousand-four hundred watts (4,400 W). As the rectifiers 65 generate heat during operation, they are mounted on a heat sink plate 70 as shown. Further detail in the heat sink plate 70 will be provided herein below. A timer 75 is provided to control operation of the device 10. For every one hour (1 h) of run time, the timer 75 also provided for one hour (1 h) of down time, thus generating a fifty percent (50%) duty cycle.

Figure 3:
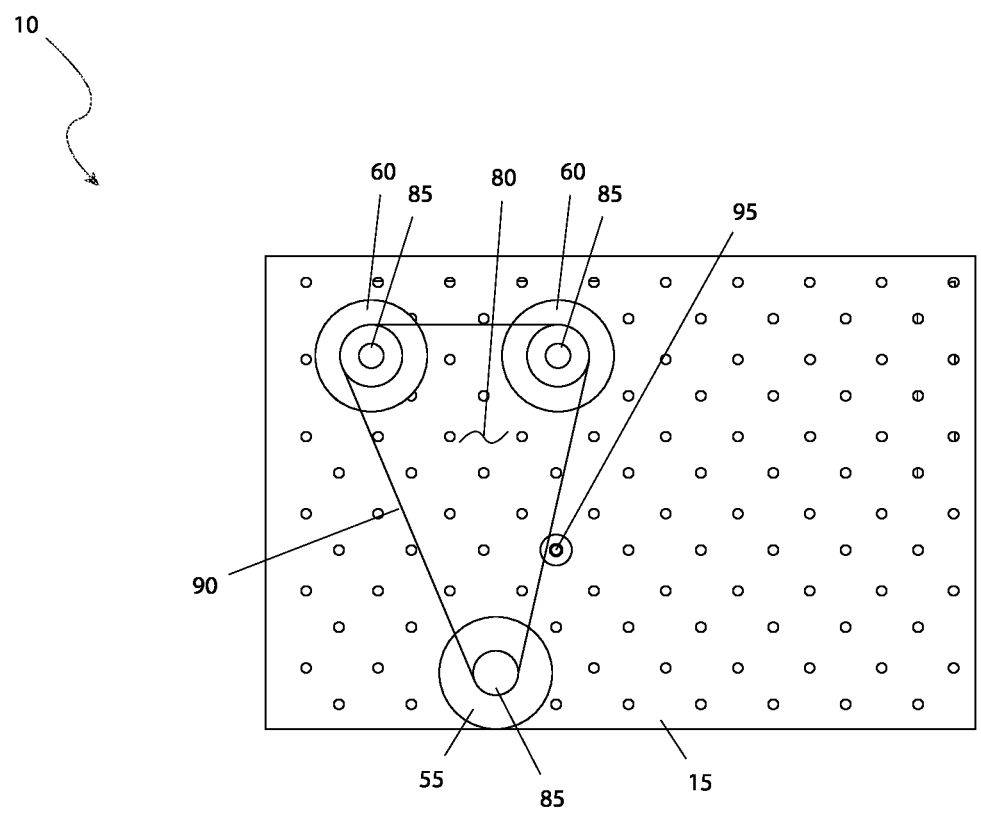
FIG. 3 is a sectional view of the electrical power conversion device 10, as seen along a Line II-II, as shown in FIG. 1, according to the preferred embodiment of the present invention.

Referring now to FIG. 3, a sectional view of the device 10, as seen along a Line II-II, as shown in FIG. 1, according to the preferred embodiment of the present invention is shown. The permanent magnet alternators (PMA) 60 (herein shown by dashed lines due to their hidden state) are mounted to a mounting plate 80 to reduce vibration. Likewise, the alternating current (AC) motor 55 (herein shown by dashed lines due to their hidden state) is mounted to the mounting plate 80 as well. The alternating current (AC) motor 55 and the permanent magnet alternators (PMA) 60 are each provided with a belt pulley with cooling fan 85. A belt 90 provides mechanical linkage between the alternating current (AC) motor 55 and the permanent magnet alternators (PMA) 60 and allows for rotation at a constant speed. The belt pulley with cooling fan 85 and the belt 90 are envisioned to be of a toothed design to prevent slippage. A belt tensioner 95 keeps proper tension on the belt 90 even as the belt 90 ages and stretches.

Figure 4:
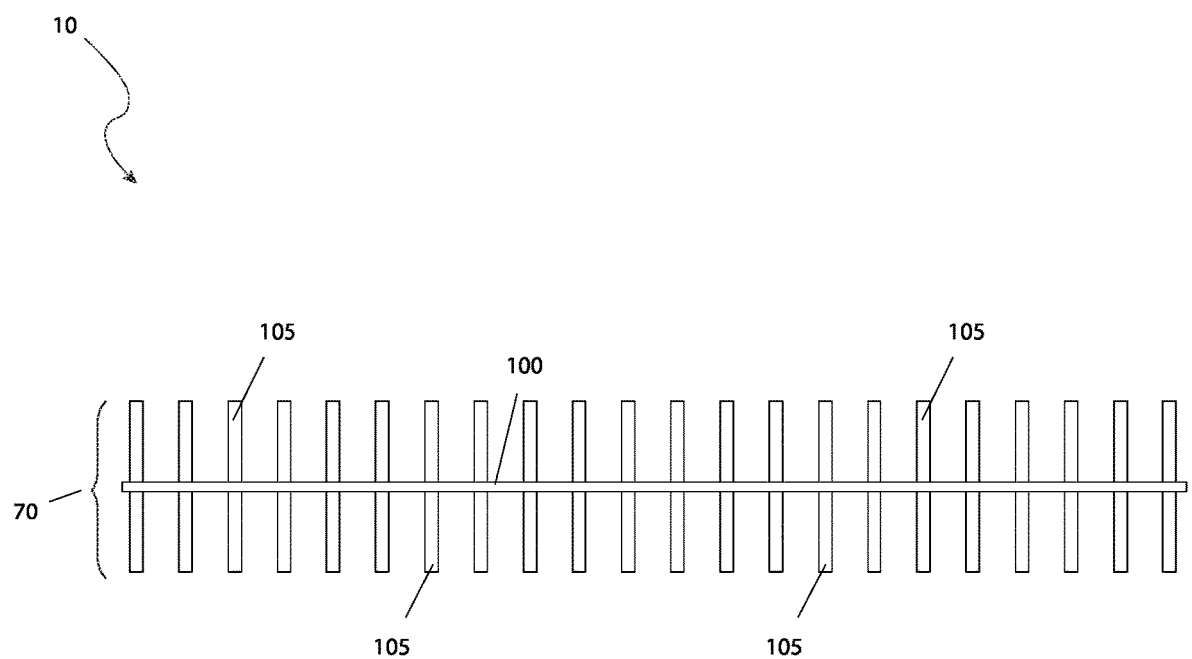
FIG. 4 is a sectional view of the heat sink plate 70 as used with the electrical power conversion device 10, as seen along a Line III-III, as shown in FIG. 3, according to the preferred embodiment of the present invention; and, FIG. 5 is an electrical block diagram of the electrical power conversion device 10, according to the preferred embodiment of the present invention.

Referring next to FIG. 4, a sectional view of the heat sink plate 70 as used with the device 10, as seen along a Line III-III, as shown in FIG. 3, according to the preferred embodiment of the present invention is disclosed. The heat sink plate 70 includes a backplane 100 upon which the rectifiers 65 (as shown in FIG. 2) are mounted. A first side of the backplane 100 is provided with multiple cooling pegs 105. Each cooling peg 105 is approximately two and one-quarter inches (2¼ in.) in total length, with one inch (1 in.) on either side of the backplane 100. The cooling pegs 105 provide additional surfaces area to dissipate heat generated by the rectifiers 65. The cooling pegs 105 are cylindrical in nature and are approximately one-quarter inch (¼ in.) in diameter and two inches (2 in.) long. Air movement as generated from the exhaust fan 50 (as shown in FIG. 2) aids in heat removal from the cooling pegs 105.

Figure 5:
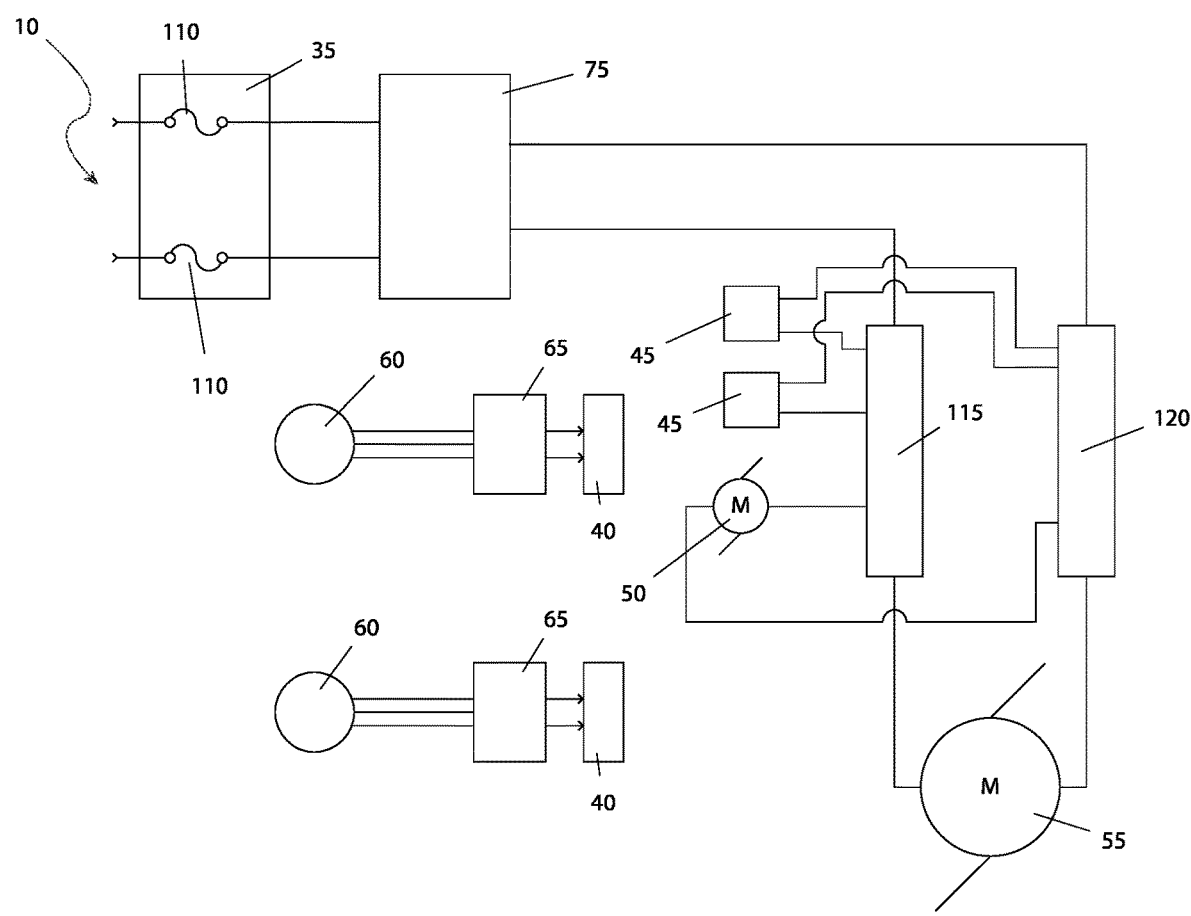

Referring to FIG. 5, an electrical block diagram of the device 10, according to the preferred embodiment of the present invention is depicted. Incoming AC electrical power is brought into the incoming disconnect switch 35 where it is protected by fuses 110. The output of the timer 75 is routed to a hot terminal block 115 and a neutral terminal block 120. Outputs from the hot terminal block 115 and the neutral terminal block 120 include at least two (2) and up to ten (10) digital displays 45, the exhaust fan 50 and the alternating current (AC) motor 55. Mechanical coupling from the belt 90 (as shown in FIG. 3) then connects the alternating current (AC) motor 55 to the permanent magnet alternators (PMA) 60. The AC output from the permanent magnet alternators (PMA) 60 is then directed to the rectifiers 65 and subsequently to the output junction box 40. It is noted although not shown, that all ground leads for all electrical components of the device 10 are connected to a common terminal block. The DC output of the output junction box 40 may be used directly as a substitute for photovoltaic panels where the DC output is fed into a charge controller. It is noted that the device 10 can be used during night time hours to produce power twenty-four hours (24 h) a day versus only the daylight hours as is the case with conventional photovoltaic panels. It may also be used with an inverter to convert the DC into AC. The resultant AC may be fed into a service panel for a home or business via a transfer switch. The output of the transfer switch may also be used to feed directly back into the incoming disconnect switch 35, thus allowing the device 10 to run in a self-generating perpetual manner. Each permanent magnet alternator (PMA) 60 will produce four thousand four hundred watts (4,400 W), while the alternating current (AC) motor 55 will consume only seven hundred forty-five watts (745 W). As such, the excess power from at least one (1), and up to ten (10) permanent magnet alternators (PMA) 60 can be used to operate the alternating current (AC) motor 55 as well as operate other desired loads such as lighting, appliances, tools, or the like. The specific usage of the output junction box 40 is not limited by the claims of the present invention.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as electrical supply houses, photovoltaic supply houses, home improvement stores, mechanical supply houses, mail order and internet supply houses and the like. Special attention would be paid to the number of permanent magnet alternators (PMA) 60 installed, the overall quantity of device 10 to be installed, electrical specifications, and the like.

After procurement and prior to utilization, the electrical power conversion device 10 would be prepared in the following manner: at least one (1) device 10 would be mechanically installed by fastening the flanges 25 to the flooring surface 30; additional device 10 may be installed on top a first device 10 in a stacked arrangement; such secure fastening is necessary due to the rotational movement generated by the alternating current (AC) motor 55 and the permanent magnet alternator (PMA) 60; incoming AC power is hooked up to the incoming disconnect switch 35; the desired DC load is then hooked up to the output junction box 40; and finally the timer 75 is programmed for proper time cycle operation. At this point in time, the device 10 is ready for use.

During utilization of the electrical power conversion device 10, the following procedure would be initiated: operation of the alternating current (AC) motor 55, the digital displays 45 and the exhaust fan 50 would be initiated by application of AC power to the incoming disconnect switch 35; mechanical coupling between the alternating current (AC) motor 55 via the belt 90 will rotate the permanent magnet alternators (PMA) 60, thus producing incrementally more power through the rectifiers 65; the output power through the output junction box 40 is then made available for use as desired by the user.

After use of the device 10 for an hour, it is cycled off for a period of one hour (1 h) to allow for cooling. The device 10 may be then used again in a cyclical manner. The features of the device 10 provide the following benefits: the power output of the invention may be scaled up or down to produce almost unlimited electrical power; it may be used at almost any location without reliance on an exterior power grid; when operating in a perpetual state it does not consume any natural resources and it does not produce unwanted pollution or undesirable operating conditions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An electrical power conversion device, comprising:
an overall enclosure made of sheet metal over a tubular frame;
a pair of floor mounting flanges utilized on a lowermost electrical power conversion device to secure the electrical power conversion device to a flooring surface;
an incoming disconnect switch activating a plurality of incoming AC power;
an output junction box activating a plurality of outgoing DC power;
a facing having between two and ten digital displays to allow for monitoring a plurality of electrical parameters;
an exhaust fan disposed on an exterior point on the overall enclosure to allow for cooling of a plurality internal components;
an alternating current motor disposed on the bottom of the overall enclosure;
a plurality of two to ten permanent magnet alternators disposed above the alternating current motor;
a plurality of two to ten rectifiers converting the AC output of the permanent magnet alternators to direct current;
a timer controlling operation for one hour of down time;
a belt mechanically linked between the alternating current motor and the permanent magnet alternators and allows for rotation at a constant speed; and
a belt tensioner keeping tension on the belt even as the belt ages and stretches.

2. The electrical power conversion device, according to claim 1, wherein the frame extends from a top and a bottom of the overall enclosure to allow for stacking of a plurality of devices for increased electrical output.

3. The electrical power conversion device, according to claim 1, wherein the overall enclosure is made of sheet steel.

4. The electrical power conversion device, according to claim 1, wherein the tubular frame is made of steel.

5. The electrical power conversion device, according to claim 1, wherein the incoming AC electrical power is brought into the incoming disconnect switch where it is protected by one or more fuses.

6. The electrical power conversion device, according to claim 1, wherein the AC output from the permanent magnet alternators is directed to the rectifiers and subsequently to the output junction box.

7. The electrical power conversion device, according to claim 1, wherein the alternating current motor is selected from the group consisting of a Dayton, a Marathon, or a one and one-half horsepower motor running at one-thousand seven hundred and fifty rotations per minute or equal.

8. The electrical power conversion device, according to claim 1, wherein the alternating current motor is mounted to a mounting plate.

9. The electrical power conversion device, according to claim 1, wherein the permanent magnet alternators are mounted to a mounting plate to reduce vibration.

10. The electrical power conversion device, according to claim 1, wherein the alternating current motor and the permanent magnet alternators are each provided with a belt pulley with a cooling fan.

11. The electrical power conversion device, according to claim 10, wherein the belt pulley with a cooling fan and the belt are toothed to prevent slippage.

12. The electrical power conversion device, according to claim 1, wherein the rectifiers generate heat during operation, they are mounted on a heat sink plate.

13. The electrical power conversion device, according to claim 12, wherein the heat sink plate includes a backplane upon which the rectifiers are mounted.

14. The electrical power conversion device, according to claim 1, wherein a first side of the backplane a plurality of cooling pegs.

15. The electrical power conversion device, according to claim 14, wherein the cooling pegs having a plurality of additional surfaces area to dissipate heat generated by the rectifiers.

16. The electrical power conversion device, according to claim 14, wherein air movement as generated from the exhaust fan aids in heat removal from the cooling pegs.

17. The electrical power conversion device, according to claim 1, wherein the timer generates a fifty percent duty cycle for everyone hour of run time.

18. The electrical power conversion device, according to claim 1, wherein the timer is routed to a hot terminal block and a neutral terminal block.

19. The electrical power conversion device, according to claim 18, wherein outputs from the hot terminal block and the neutral terminal block include two to ten digital displays, the exhaust fan, and the alternating current motor.

20. The electrical power conversion device, according to claim 1, wherein mechanical coupling from the belt then connects the alternating current (AC) motor to the permanent magnet alternators.

* * * * *